United States Patent
Russell et al.

(10) Patent No.: US 6,971,749 B2
(45) Date of Patent: Dec. 6, 2005

(54) BLOWER SYSTEM

(75) Inventors: Brian Russell, Portland, OR (US);
Pamela Deshon-Stepp, Canby, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/860,380

(22) Filed: Jun. 2, 2004

(65) Prior Publication Data

US 2004/0263796 A1 Dec. 30, 2004

Related U.S. Application Data

(60) Provisional application No. 60/475,298, filed on Jun. 2, 2003.

(51) Int. Cl.[7] ............................................. G03B 21/16
(52) U.S. Cl. ........................................ 353/58; 353/61
(58) Field of Search ............................. 353/57, 58, 59, 353/60, 51, 119

(56) References Cited

U.S. PATENT DOCUMENTS

| | | | |
|---|---|---|---|
| 4,739,396 A | 4/1988 | Hyatt | |
| 6,007,205 A * | 12/1999 | Fujimori | 353/57 |
| 6,350,033 B1 * | 2/2002 | Fujimori | 353/61 |
| 6,481,854 B1 * | 11/2002 | Sugawara et al. | 353/52 |
| 6,637,895 B2 | 10/2003 | Fujimori et al. | |

* cited by examiner

*Primary Examiner*—William C. Dowling
(74) *Attorney, Agent, or Firm*—Alleman Hall McCoy Russell & Tuttle LLP

(57) ABSTRACT

In a projection device including a casing having an inlet vent and an outlet vent, and a plurality of components including a light source disposed within the casing, a blower system is provided, wherein the blower system includes a plurality of blower portions operable to draw air into the casing through an inlet vent, circulate air among the plurality of components, and eject circulated air from the casing through an outlet vent; and a blower motor configured to operate the plurality of blower portions.

32 Claims, 2 Drawing Sheets

BLOWER SYSTEM

CROSS-REFERENCE TO RELATED APPLICATIONS

The present application claims priority under 35 U.S.C. § 119 to U.S. Provisional Patent Application Ser. No. 60/475,298, which was filed on Jun. 2, 2003. The disclosure of that application is hereby incorporated by reference in its entirety for all purposes.

TECHNICAL FIELD

The present invention relates generally to blowers for cooling electronic devices, and more specifically to integrated blower systems for use in projection devices.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

In one embodiment of the present invention, a single blower system is provided for use in a projection device. The single blower system may include a bifurcated blower having a blower portion configured to recirculate at least some air back into the projection device, such as to cool a light source.

Figure 1:
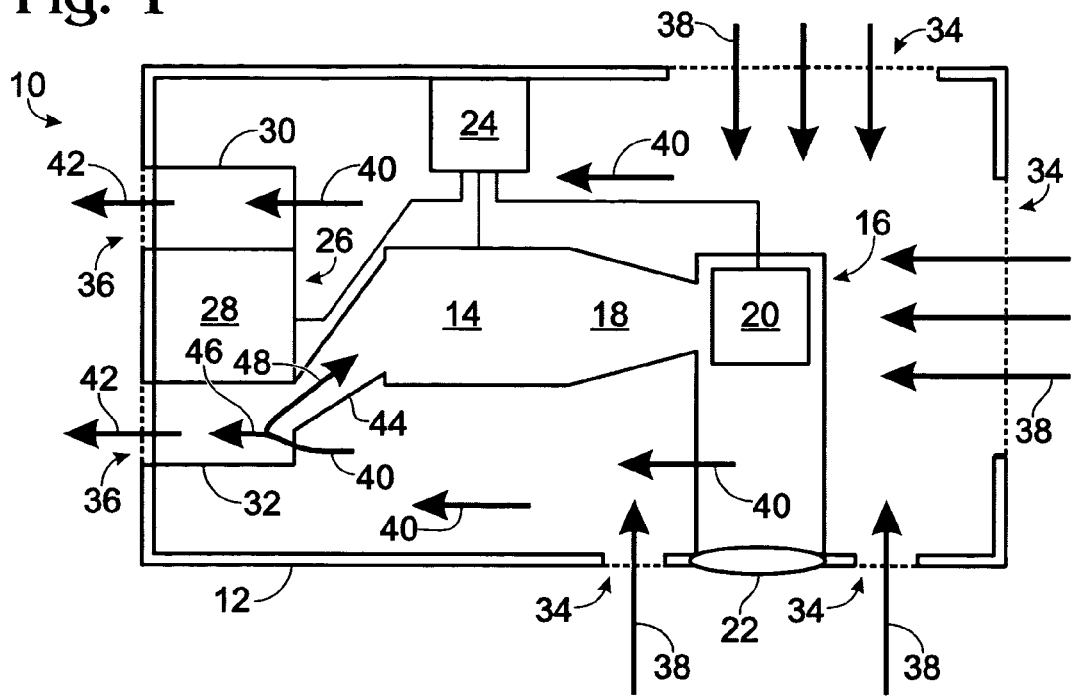
FIG. 1 is a schematic illustration of an embodiment of a projection device, showing a recirculation duct coupling a blower portion with a light source, and showing air movement through the projection device.

A projection device 10 is illustrated schematically in FIG. 1. Projection device 10 may be a projector adapted to project an image onto a display surface such as a screen, a wall, or other viewing surface or area. Projection device 10 may be any suitable display device or image projector including, but not limited to, a digital projector, a liquid crystal display (LCD) projector, a digital light processing projector, etc.

In some configurations, the projection device may include components disposed generally within a casing 12, such as a light source 14 and an optical engine (or light engine) 16. Light source 14 may be adapted to produce a beam of light and project the light toward optical engine 16, which may be configured to generate an image.

Light source 14 may include a lamp, such as a metal halide lamp or an ultra-high-pressure (UHP) arc lamp, positioned within a reflector, which may be configured to direct most of the emitted light along a predetermined path. For example, light emitted from light source 14 may be channeled through a spacer or interface tube 18, to the optical engine. The emitted light may also pass through one or more filters, such as an infrared (IR) or ultraviolet (UV) filter, to filter out unwanted parts of the emission spectra of the lamp.

Optical engine 16 may include optical elements such as filters, lenses, mirrors, condensers, and the like. Optical engine 16 may also include an image-producing element 20 such as a digital micromirror (DMD), an LCD panel, or any other suitable image source. Image-producing element 20 may be configured to project light toward one or more mirrors or other optics, such as a projection lens 22, which in turn may be configured to direct light toward a display surface.

A projection device may include one or more power sources 24, linked to components such as light source 14, image producing element 20, and/or other components such as a power circuit board, a control circuit board, and so forth, within the projection device.

Operation of light source 14 and other electronic components in projection device 10 may increase the temperature of the device during use. If the temperature of the device exceeds critical limits, portions of the device may malfunction and/or have a shorter life span. Maintaining temperatures within the device at operating levels thus may prevent the device from malfunctioning and/or increase the lifespan of components and parts.

A blower system 26 may be provided to circulate ambient air through the projection device and eject circulated air, thus helping to cool projection device components. A blower system may include a blower portion, such as a fan, wheel, or similar air mover, powered by a blower motor.

In some projection devices, a blower system may include several blower motors, each coupled to a blower portion, disposed in several places throughout the interior of the device. For example, some blower systems may include a first blower motor and fan configured to draw ambient air into the device, a second blower motor and fan specifically configured to circulate air around a selected electronic component such as the light source, a third blower portion and fan configured to direct air to another selected location within the casing, and so forth.

However, a blower system optionally may include a blower motor and more than one blower portions collectively mounted as an integrated unit within the casing, configured to draw air into the casing, circulate and/or direct air among components, and eject circulated air from the casing. Such an integrated blower system may occupy less space, and produce less noise, than a blower system consisting of several blower motors and blower portions disposed in several places throughout the interior of a projection device.

For example, blower system 26 may include a blower motor 28 with two blower portions 30, 32, mounted thereon, both driven and powered by blower motor 28. The term "integrated" may be used to describe this blower configuration, as a single motor 28 drives two blower portions 30, 32 to cool the entire projection device 10 from a single general location within the projection device. Blower motor 30 may be coupled to power source 24 to provide power to blower motor 30. Furthermore, blower system 26 may include rubber mounts or feet 33 (shown in FIG. 3) configured to reduce vibration within the device.

Projection device 10 may further have a plurality of inlet vents 34 and a plurality of outlet vents 36. Thus, each blower portion 30, 32 may be configured to draw ambient air from outside projection device 10 through inlet vents 34 and into the projection device (indicated by arrows 38). The ambient air may then be drawn through projection device 10 and circulated around the various components within the projection device (indicated by arrows 40). Circulated air may be expelled from the projection device through outlet vents 36 (indicated by arrows 42).

A recirculation duct 44 may be coupled to, or interface with, one or both of blower portions 30, 32. A recirculation duct may be configured to direct circulated air back into the projection device. In some embodiments, a recirculation duct may direct circulated air specifically to a predetermined component, such as light source 14. In other embodiments, the recirculation duct may direct circulated air nonspecifically back into the device.

An integrated blower system thus may be configured to bifurcate circulated air flow by directing a portion of the circulated air drawn through one or more blower portions into a recirculation duct, and by expelling the remainder of the circulated air from the projection device. Some embodiments of bifurcated blower systems may include one or more blower portions, each configured either to direct circulated air into a recirculation duct or to expel circulated air. Other embodiments of bifurcated blower systems may include one or more bifurcated blower portions, each provided with a recirculation duct, each configured to direct a portion of circulated air into the recirculation duct and to expel the remainder of circulated air from the device.

For example, in the exemplary embodiment illustrated in FIG. 1, recirculation duct 44 may be configured to direct air circulated by bifurcated blower portion 32. Circulated air 40 may be drawn into bifurcated blower portion 32, which may divide the air flow such that a portion of the circulated air, indicated by arrow 46, is expelled out of the projection device, and another portion, indicated by arrow 48, is directed through recirculation duct 44 toward light source 14, thus providing air directly to the light source. The air may then circulate around the light source and then be drawn back into integrated blower system 26, to either be expelled or further recirculated.

Figure 2:
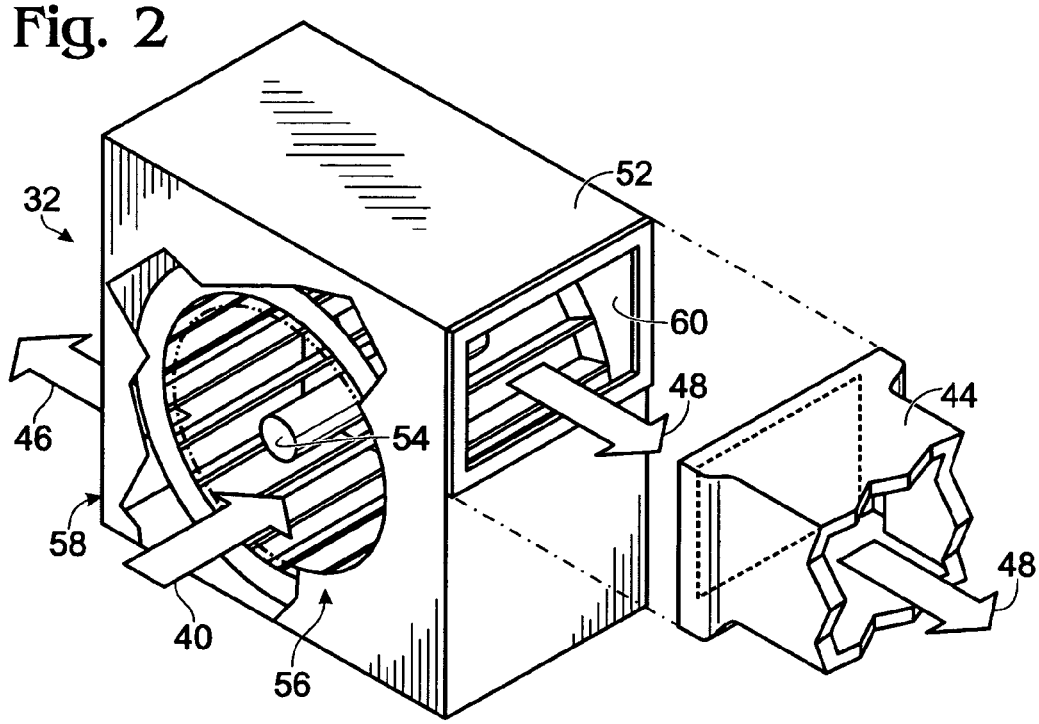
FIG. 2 is an isometric view of an exemplary configuration of the blower portion and the recirculation duct of the embodiment of FIG. 1, showing air movement through the blower portion and recirculation duct.

FIG. 2 illustrates an exemplary configuration of bifurcated blower portion 32, which may include a fan 50 disposed within a housing 52. Fan 50, shown as a wheel fan, may be rotatable about an axle 54, which may be coupled to a blower motor (not shown). Housing 52 may have an intake 56 disposed generally along the axis of axle 54 and one or more exits 58, 60 disposed generally along the periphery of housing 52.

Rotation of fan 50 may draw air (such as circulated air 40) in through intake 56 and force the air outward through exits 58, 60. Exit 58 may lead to an outlet vent (not shown), such that the portion of air forced through exit 58 (indicated by arrow 46) may be expelled from the projection device. Exit 60 may be coupled to recirculation duct 44, such that the portion of air forced through exit 60 (indicated by arrows 48) may be directed through recirculation duct 44.

Bifurcated blower portion 32 may be adapted to direct a selected percentage of air drawn into fan 50 into recirculation duct 44, for example, by configuring aspects of exits 58, 60 such as relative size, orientation, shape, and so forth. Some embodiments of bifurcated blower systems thus may include a bifurcated blower portion configured to direct, or recirculate, about 50% of the air drawn into the bifurcated blower portion through the recirculation duct and expel the remaining portion, if, for example, exits 58 and 60 are the same size, shape, and orientation relative to fan 50.

The configuration of a bifurcated blower portion may be varied to recirculate more or less air as desired, for example, to recirculate about 10% of the air and expel the remaining about 90%, to recirculate about 75% and to expel about 25%, and so forth. In these and other configurations, irregularities in airflow through fan 50 may cause variances of up to +/–5% in the portions of air recirculated and/or expelled.

Bifurcated blower portion 32 is represented in FIG. 2 as a wheel fan with one intake and two exits, one of which is coupled to a recirculation duct. Other bifurcated blower systems may include bifurcated blower portions with different fans, internal structure, and/or combinations of intakes and exits than as depicted in bifurcated blower portion 32.

From the principles discussed above it should be understood that a bifurcated blower system may be configured to direct any desired portion of circulated air to one or more selected components or specific locations in a projection device, through the use of one or more blower portions configured to direct air in a selected direction and/or one or more bifurcated blower portions, and by configuring aspects of the blower portions such as relative size, position, speed, and so forth.

Further, recirculation ducts coupled to blower portions of a bifurcated blower system may direct circulated air to any selected component or location in a projection device. In some embodiments, a recirculation duct may be configured to be permanently attached to, and/or fabricated integrally with, a selected component and/or a blower portion. In other embodiments, recirculation ducts may be detachably coupled to components and/or blower portions.

Figure 3:
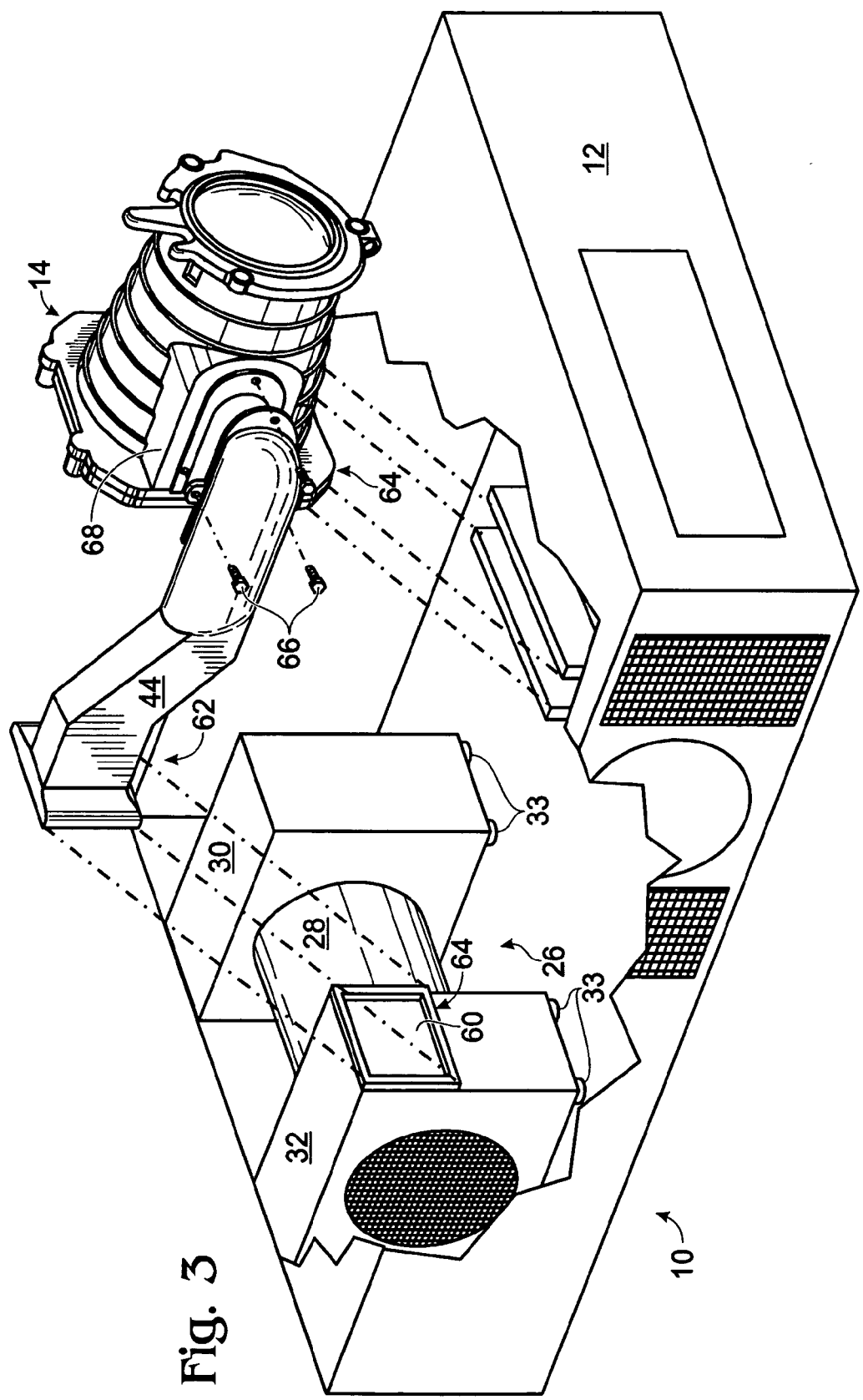
FIG. 3 is an isometric view of another embodiment of a projection device showing an exemplary connection of a recirculation duct to a light source.

FIG. 3 shows another embodiment of projection device 10, in which bifurcated blower system 26 includes blower motor 28 disposed between blower portions 30, 32. Recirculation duct 44 may direct circulated air from blower portion 32 to light source 14.

Recirculation duct 44 may be detachably coupled to blower portion 32, for example to enable replacement of the light source without replacement or removal of blower system 26. Thus, a first end 62 of recirculation duct 44 may include attachment and/or retaining mechanisms or features such as a snap-on device 64, such that first end 62 may be selectively secured against exit 60 of blower portion 32.

Optionally, recirculation duct 44 may be detachably coupled to light source 14, for example to enable replacement of the light source without replacement of recirculation duct 44. Correspondingly, a second end 64 of recirculation duct 44 may include attachment and/or retaining mechanisms or features such as a plurality of screws 66, such that second end 62 may be selectively secured against a housing 68 enclosing light source 14.

Although snap-on device 64 and screws 66 are indicated in FIG. 3, other attachment and/or retaining mechanisms such as clips, dovetail joints, mortise and tenon joints, and the like, as well as suitable adhesives, may be used to detachably couple recirculation duct 44 to blower portion 32 and/or to housing 68 of light source 14.

While the inventions defined in the following claims have been particularly shown and described with reference to the foregoing examples, those skilled in the art will understand that many variations may be made therein without departing from the spirit and scope of the inventions. Other combinations and sub-combinations of features, functions, elements, component, actions, and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The foregoing embodiments are illustrative, and no single feature, component, or action is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second, and third, for identified elements or actions are used to distinguish between the elements and actions, and do not indicate a required or limited number of such elements or actions, nor does it indicate a particular position or order of such elements or actions unless otherwise specifically stated.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In a projection device including a casing having an inlet vent and an outlet vent, and a plurality of components including a light source disposed within the casing, a blower system, comprising:
   a plurality of blower portions operable to:
      draw air into the casing through an inlet vent;
      circulate air among the plurality of components; and
      eject circulated air from the casing through an outlet vent; and
   a blower motor configured to operate the plurality of blower portions.

2. The blower system of claim 1, wherein the plurality of blower portions is further operable to direct a portion of circulated air to a selected component.

3. The blower system of claim 2, wherein the portion of circulated air directed to a selected component is about 50%.

4. The blower system of claim 2, further including a recirculation duct detachably coupled to the blower system; wherein the plurality of blower portions is operable to direct a portion of circulated air through the recirculation duct to a selected component.

5. The blower system of claim 4, wherein the selected component includes a light source.

6. The blower system of claim 5, wherein the light source is disposed substantially within a housing, and wherein the recirculation duct is detachably coupled to the housing.

7. The blower system of claim 1, further comprising a vibration dampener for mounting the blower system within the casing.

8. The blower system of claim 7, wherein the vibration dampener includes one or more rubber mounts.

9. The blower system of claim 1, wherein at least one of the plurality of blower portions includes a wheel fan.

10. The blower system of claim 1, further including two blower portions.

11. The blower system of claim 10, wherein the blower motor is interposed between two blower portions.

12. The blower system of claim 2, wherein the plurality of blower portions includes a first blower portion operable to direct a portion of circulated air to a selected component and a second blower portion operable to eject circulated air from the casing through an outlet vent.

13. The blower system of claim 4, wherein the plurality of blower portions includes a first blower portion operable to direct a portion of circulated air through the recirculation duct and a second blower portion operable to eject circulated air from the casing through an outlet vent.

14. A projection device, comprising:
   a casing having an inlet vent and an outlet vent;
   a plurality of components disposed within the casing;
   a bifurcated blower system mounted within the casing, the bifurcated blower system further including a blower portion and a blower motor to operate the blower portion; and
   a recirculation duct coupled to the bifurcated blower system;
   wherein the bifurcated blower system is operable to draw air into the casing through an inlet vent, circulate air among a plurality of components, direct a portion of circulated air through the recirculation duct, and eject the remainder of the circulated air from the casing through an outlet vent.

15. The projection device of claim 14, wherein the recirculation duct is further coupled to a selected component; such that the recirculation duct is adapted to direct a predetermined portion of circulated air to the selected component.

16. The projection device of claim 15, wherein the recirculation duct is detachably coupled to the blower system.

17. The projection device of claim 16, wherein the selected component includes a light source.

18. The projection device of claim 17, wherein the light source is disposed substantially within a housing, and wherein the recirculation duct is detachably coupled to the housing.

19. The projection device of claim 14,
   wherein the blower system includes a first blower portion and a second blower portion;
   wherein the recirculation duct is coupled to the first blower portion;
   wherein the first blower portion is configured to direct at least a portion circulated air into the recirculation duct; and
   wherein the second blower portion is configured to eject at least a portion of circulated air from the casing through an outlet vent.

20. The projection device of claim 19, wherein the blower motor is interposed between the first blower portion and the second blower portion.

21. The projection device of claim 19, wherein the predetermined portion is about 50%.

22. The projection device of claim 19, wherein the recirculation duct is detachably coupled to the first blower portion.

23. The projection device of claim 14, wherein the recirculation duct is coupled to the blower portion; and wherein the blower portion is configured to direct a predetermined portion of circulated air through the recirculation duct and eject a remainder of circulated air from the casing through an outlet vent.

24. The projection device of claim 23, wherein the predetermined portion is about 50%.

25. The projection device of claim 23, wherein the recirculation duct is detachably coupled to the blower portion.

26. The projection device of claim 25, wherein the recirculation duct is further coupled to a selected component; such that the recirculation duct is adapted to direct a predetermined portion of circulated air to the selected component.

27. The projection device of claim 26, wherein the selected component includes a light source.

28. The blower system of claim 27, wherein the light source is disposed substantially within a housing, and wherein the recirculation duct is detachably coupled to the housing.

29. The projection device of claim 14, wherein the blower portion includes a squirrel cage fan.

30. A blower system for a projection device comprising an integrated blower system comprising;
    a first blower portion;
    a second blower portion; and
    a blower motor configured to operated the first blower portion and second blower portion
    wherein the first blower portion is configured to recirculate air in the projection device.

31. The blower system of claim 30, wherein the second blower portion is configured to expel air from the projection device.

32. The blower system of claim 30 wherein the first blower portion is configured to direct air to a light source.

* * * * *